Sept. 18, 1956 G. A. OLIVE 2,763,842

COAXIAL CONDUCTOR CIRCUIT, INCLUDING COUPLING LOOP

Filed May 2, 1955

INVENTOR.
GEORGE A. OLIVE
BY Charles H. Brown
ATTORNEY

United States Patent Office 2,763,842

Patented Sept. 18, 1956

2,763,842

COAXIAL CONDUCTOR CIRCUIT, INCLUDING COUPLING LOOP

George A. Olive, Princeton, N. J., assignor to Radio Corporation of America, a corporation of Delaware Application May 2, 1955, Serial No. 505,148

9 Claims. (Cl. 333—33)

This invention relates to ultra high frequency coaxial conductor circuits, and more particularly to circuits including coupling loops between the conductors.

While not limited thereto, the invention is particularly useful in an ultra high frequency amplifier having an amplifier tube mounted at one end of three coaxial conductors which form an inner input cavity and an outer coaxial output cavity. Annular tuning plungers between the conductors determine the axial lengths of the respective input and output cavities. Energy is coupled to the input cavity from the tuning plunger end thereof because the output cavity surrounds all other points of access to the input cavity. Coaxial conductor circuits are dimensioned in accordance with the desired frequency of operation. At ultra high frequencies, the physical dimensions are relatively small and conventional practices are inadequate for providing the necessary degree of coupling in the small space available.

It is an object of this invention to provide an improved construction by which energy can be coupled to or from a cavity formed between coaxial conductors of relatively small diameters.

It is another object to provide an improved vacuum tube input circuit which is readily tuned to a desired operating frequency.

It is a further object to provide an improved coaxial conductor vacuum tube circuit having desired electrical characteristics in combination with physical compactness.

According to one embodiment illustrative of the invention, inner, intermediate and outer coaxial conductors are adapted at one end for coupling to electrode contact rings of a vacuum tube. The space between the intermediate and outer conductors constitute an output cavity having an axial length determined by an output tuning plunger. The space between the inner and intermediate conductors constitute an input cavity having an axial length determined by an input tuning plunger. An input coupling loop in the input cavity includes two conductive strips extending from the tuning plunger, one of the strips being folded back, the folded back portion being insulated from the other strip to form a capacitor in series with the loop. The input tuning plunger includes conductive and insulating cylinders forming a direct current blocking capacitor.

These and other objects and aspects of the invention will be apparent to those skilled in the art from the following more detailed description taken in conjunction with the appended drawing, wherein.

Figure 1:
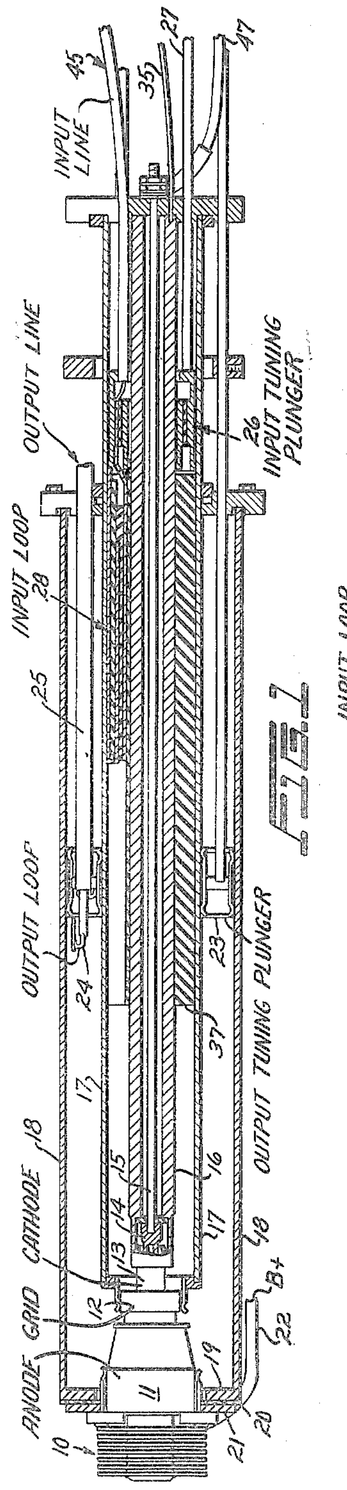
Figure 1 is a sectional view of an ultra high frequency amplifier constructed according to the teachings of this invention.

The drawing illustrates a power amplifier suitable for amplifying a television signal in the ultra high frequency range to provide an output power of the order of 15 watts. Such an amplifier is useful, for example, in television booster stations where a television signal from a distant transmitter is received and retransmitted to television receivers in the immediate vicinity of the booster station. A vacuum tube 10, which may be an RCA Type 2C39A vacuum tube, is provided with an anode contact ring 11, a grid contact ring 12, a cathode and filament contact ring 13, and another filament contact prong 14. An innermost conductor 15 connects to the filament prong 14. A hollow cylindrical inner conductor 16 is connected to the cathode and filament contact ring 13. An intermediate cylindrical conductor 17 surrounds the conductor 16 and is connected to the grid contact ring 12. An outer cylindrical conductor 18 is coupled thru a flange 19, an insulating washer 20 and socket means 21 (together constituting a blocking capacitor) to the anode contact ring 11. Lead 22 carries B+ potential to the anode ring 11 but not to the outer conductor 18 by reason of the presence of the blocking capacitor. The electrical length of the output cavity formed between the intermediate conductor 17 and the outer conductor 18 is determined by the position of an annular tuning plunger 23. Output energy is coupled from the output cavity by means of a loop 24 and an output coaxial line 25.

Figure 2:
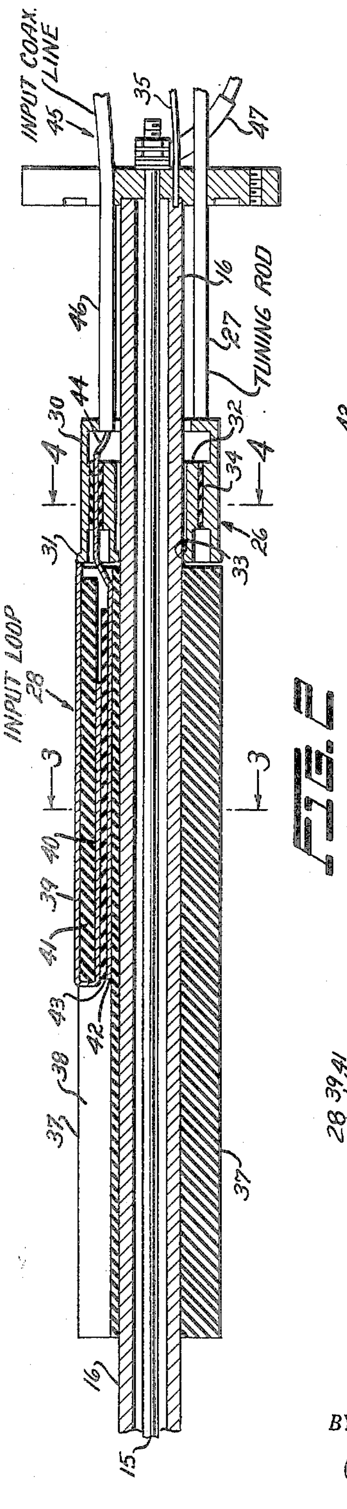
Figure 2 is an enlarged sectional view of the central portion of the amplifier of Figure 1.
Figure 4:
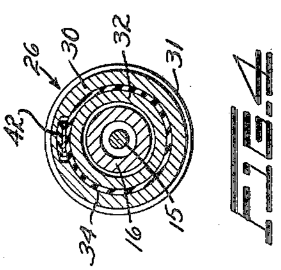
Figure 4 is a sectional view taken on the line 4—4 of Figure 2.
Figure 3:
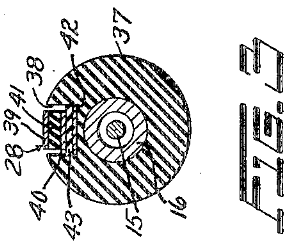
Figure 3 is a sectional view taken on line 3—3 of Figure 2.

The input cavity formed between the inner cylindrical conductor 16 and the intermediate cylindrical conductor 17 has an electrical length determined by a tuning plunger 26 operated by means of a rod 27. The input cavity also includes a coupling loop 28. The construction of the tuning plunger 26 and coupling loop 28 is shown in enlarged form in Figure 2 of the drawing.

Tuning plunger 26 includes an outer cylindrical ring 30 provided with contact fingers 31 which engage the intermediate conductor 17. The tuning plunger 26 also includes an inner conductive cylindrical ring 32 provided with spring fingers 33 contacting the inner conductor 16. The inner and outer rings 32 and 30 are separated by a cylindrical insulator 34 so that the tuning plunger 26 also constitutes a direct current blocking capacitor. By this construction, the cathode biasing potential applied over the lead 35 is prevented from appearing on the intermediate conductor 17, while at the same time the blocking capacitor provides a coupling for radio frequency energy.

A cylindrical insulator 37 is positioned between the inner cylindrical conductor 16 and the intermediate cylindrical conductor 17, and is provided with a longitudinally extending slot or groove 38. The input coupling loop 28 is positioned in the groove 38. The coupling loop includes a first conductive strap having one end soldered or otherwise connected to the outer ring 30 of the tuning plunger 26, and having a main portion 39 and a folded back portion 40. An insulating strip 41 is positioned between the main portion 39 and the folded back portion 40 to maintain the two portions in spaced relationship.

The input coupling loop 28 also includes a second conductive strip 42 separated from the folded back portion 40 by means of an insulating strip 43. One end of conductive strip 42 is carried thru an insulated aperture in the tuning plunger 26 to the inner conductor 44 of a coaxial input line 45 including an outer conductor 46. The coupling loop 28 is connected on one side to the outer conductor 46 thru the conductive ring 30 which contacts the outer conductor 17, and this loop 28 is connected on the other side to the inner conductor 44 of the input coaxial line 45. The coupling loop is mechanically interrupted by the insulating strip 43 which constitutes the dielectric of a capacitor in series with the coupling loop. The various conductive and insulating strips constituting the coupling capacitor are cemented to one another and to the cylindrical insulator 37, so that the tuning plunger 26, the coupling loop 28 and the associated cylindrical insulator 37 are axially movable as a unit between the inner conductor 16 and the intermediate cylindrical conductor 17 by means of the tuning rod 27.

One side of the filament in the tube 10 is supplied thru the innermost conductive rod 15 from a source connected to the lead 47. The other side of the filament and the cathode in the tube 10 are supplied with energizing and bias potentials thru the inner conductor 16 by means of lead 35. The grid in the tube 10, being connected to the intermediate cylindrical conductor 17, is maintained at ground potential.

In adjusting the input circuit for optimum performance, it is convenient to start with a coupling loop 28 having an axial length sufficiently long so that it can be reduced in the process of determining the proper length. Energy is applied from a source thru a slotted line, and thru the input coaxial line 45 to the input coupling loop 28. The tube 10 is energized and the tuning plungers 23 and 26 are adjusted in position to provide maximum gain in the amplifier. The input standing wave ratio will normally not be unity, so the capacitance of the series capacitor in the coupling loop 28 is reduced by shortening the length of the conductive strip 42. The input and output cavities are again tuned for maximum output and the input standing wave ratio again determined. This procedure is repeated until a length for the conductive strip 42 is found which results in a minimum input standing wave ratio. The size of the coupling loop is then reduced by cutting off the end of the folded back portion 40 of the other conductive strip and by also shortening the insulating strip 41. The conductive strip is folded back around the shortened insulating strip 41 to provide a coupling loop having a shorter axial length. All the previous steps are then repeated and the process continued until it is found that the input standing wave ratio is equal to one. The amplifier will then be operating under conditions of optimum coupling to the input circuit, and the amplifier provides the maximum useful gain or amplification.

An embodiment of the invention built and successfully operated at 530 megacycles included an RCA Type 2C39A vacuum tube, an outer conductor 18 having an outer diameter of two inches, and other mechanical parts having substantially the same relative dimensions as represented in the drawing.

It is apparent that according to this invention there is provided an improved adjustable construction whereby energy is coupled to a coaxial conductor circuit to provide optimum coupling thereto.

What is claimed is:

1. In a high frequency apparatus, the combination of a pair of coaxial conductors, a tuning plunger between said conductors, a first longitudinally extending conductive strip having a main portion with one end mechanically fastened to said plunger and having a folded back portion, a second longitudinally extending conductive strip in parallel spaced relation with said folded back portion and having one end mechanically fastened to and electrically insulated from said plunger, and insulating material between said first and second strips, said conductive strips constituting a coupling loop including a series capacitor formed by the folded back portion of said first conductive strip, said second conductive strip, and the insulating material therebetween.

2. In a high frequency apparatus, the combination of a pair of coaxial conductors, a tuning plunger between said conductors, a first longitudinally extending conductive strip having a main portion with one end mechanically fastened to said plunger and having a folded back portion, a second longitudinally extending conductive strip in parallel spaced relation with said folded back portion and having one end mechanically fastened to said plunger, at least one of said first and second conductive strips being electrically insulated from said tuning plunger, and insulating material between said second strip and the folded back portion of said first strip, said conductive strips constituting a coupling loop including a series capacitor formed by the folded back portion of said first conductive strip, said second conductive strip, and the insulating material therebetween.

3. Means to couple energy to or from a high frequency circuit including a pair of coaxial conductors comprising a cylindrical insulator between said conductors, said cylindrical insulator having a longitudinal groove, a coupling loop in said groove, said coupling loop including a first conductive strip having a main portion and a folded back portion, a first insulating strip between said portions, a second conductive strip in parallel spaced relation with said folded back portion, and a second insulating strip between said first and second conductive strips, said conductive strips constituting a coupling loop including a series capacitor formed by the folded back portion of said first conductive strip, said second conductive strip, and said insulating strip therebetween.

4. Means to couple energy to or from a high frequency circuit including a pair of coaxial conductors comprising a cylindrical insulator between said conductors, said cylindrical insulator having a longitudinal groove, a coupling loop in said groove, said coupling loop including a first conductive strip having a main portion and a folded back portion, a first insulating strip between said portions, a second conductive strip, and a second insulating strip between said second conductive strip and the folded back portion of said first conductive strip, said conductive strips constituting a coupling loop including a series capacitor formed by the folded back portion of said first conductive strip, said second conductive strip, and the insulating material therebetween.

5. Means to couple energy to or from a high frequency circuit including a pair of coaxial conductors comprising a first cylindrical insulator between said conductors, said cylindrical insulator having a longitudinal groove, a coupling loop in said groove, said coupling loop including a first conductive strip having a main portion and a folded back portion, a first insulating strip between said portions, a second conductive strip, a second insulating strip between said second conductive strip and the folded back portion of said first conductive strip, said conductive strips constituting a coupling loop including a series capacitor formed by the folded back portion of said first conductive strip, said second conductive strip, and said second insulating strip, a tuning plunger between said conductors and having an aperture therein, said tuning plunger including an outer conductive contact ring, an inner conductive ring, and a second cylindrical insulator between said rings, one of said conductive strips being connected to one of said conductive rings, and the other of said conductive strips being passed thru the aperture in said tuning plunger.

6. Means to couple energy to or from a high frequency circuit including a pair of coaxial conductors comprising a first cylindrical insulator between said conductors, said cylindrical insulator having a longitudinal groove, a coupling loop in said groove, said coupling loop including a first conductive strip having a main portion and a folded back portion, a first insulating strip between said portions, a second conductive strip, a second insulating strip between said second conductive strip and the folded back portion of said first conductive strip, said conductive strips constituting a coupling loop including a series capacitor formed by the folded back portion of said first conductive strip, said second conductive strip, and said second insulating strip therebetween, a tuning plunger between said conductors, said tuning plunger including an outer conductive contact ring, an inner conductive contact ring, and a second cylindrical insulator therebetween to form a direct current blocking capacitor, one end of said first conductive strip being connected to said outer conductive ring, and one end of said second conductive strip being passed thru an insulating aperture in said tuning plunger.

7. A high frequency apparatus comprising outer, intermediate and inner concentric cylindrical conductors adapted at one end for coupling to electrode contact rings of a vacuum tube, a first annular tuning plunger between said outer and intermediate conductors, a second annular tuning plunger between said intermediate and inner conductors, a cylindrical insulator between said intermediate and inner conductors and axially between said second tuning plunger and the tube end of said conductors, said cylindrical insulator having a longitudinal groove, a coupling loop in said groove, said coupling loop including a first conductive strip having a longitudinally extending portion and a folded back portion, a first insulating strip between said two portions, a second conductive strip, and a second insulating strip between said first and second conductive strips, said conductive strips constituting a coupling loop including a series capacitor formed by the folded back portion of said first conductive strips, said second conductive strip, and said second insulating strip therebetween.

8. A high frequency apparatus comprising outer, intermediate and inner concentric cylindrical conductors adapted at one end for coupling to electrode contact rings of a vacuum tube, a first annular tuning plunger between said outer and intermediate conductors, a second annular tuning plunger between said intermediate and inner conductors, a cylindrical insulator between said intermediate and inner conductors and between said second tuning plunger and the tube end of said conductors, said cylindrical insulator having a longitudinal groove, a coupling loop in said groove, said coupling loop including a first conductive strip having a longitudinally extending portion and a folded back portion, a first insulating strip between said two portions, a second conductive strip, and a second insulating strip between the folded back portion of said first conductive strip and said second conductive strip, said conductive strips constituting a coupling loop including a series capacitor formed by the folded back portion of said first conductive strip, said second conductive strip, and said second conductive strip therebetween, said conductive and insulating strips being mechanically connected with said grooved cylindrical insulator and said second tuning plunger for axial movement as a unit between said inner and intermediate conductors.

9. Means to couple energy to or from a high frequency circuit including a pair of coaxial conductors comprising a first cylindrical insulator dimensioned to fit snugly between said coaxial conductors, said cylindrical insulator having a longitudinal groove in the outer surface thereof, a coupling loop in said groove including a first conductive strip having a main portion positioned at the open edge of said groove and having a folded back portion in the groove, a first insulating strip between said portions, a second conductive strip positioned in the bottom of said groove, a second insulating strip between the folded back portion of said first conductive strip and said second conductive strip, said conductive strips constituting a coupling loop including a series capacitor formed by the folded back portion of said first conductive strip and said second conductive strip and said second insulating strip therebetween, a tuning plunger between said conductors, said tuning plunger including an outer conductive contact ring, an inner conductive contact ring, and a second cylindrical insulator therebetween to form a direct current blocking capacitor, one end of said first conductive strip being connected to said outer conductive ring, and one end of said second conductive strip being passed thru an insulating aperture in said tuning plunger, said tuning plunger and said first cylindrical insulator and said tuning loop being mechanically connected for axial movement as a unit within said coaxial conductors.

References Cited in the file of this patent

UNITED STATES PATENTS

| | | |
|---|---|---|
| 2,395,165 | Collard | Feb. 19, 1946 |
| 2,653,301 | Moore et al. | Sept. 22, 1953 |
| 2,662,937 | Horvath | Dec. 15, 1953 |